(12) United States Patent
Sugashima et al.

(10) Patent No.: US 11,757,745 B2
(45) Date of Patent: Sep. 12, 2023

(54) GATEWAY APPARATUS, ABNORMALITY MONITORING METHOD, AND STORAGE MEDIUM

(71) Applicant: DENSO CORPORATION, Kariya (JP)

(72) Inventors: Takeshi Sugashima, Kariya (JP); Keiichi Bando, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/928,034

(22) Filed: Jul. 14, 2020

(65) Prior Publication Data

US 2021/0021498 A1 Jan. 21, 2021

(30) Foreign Application Priority Data

Jul. 17, 2019 (JP) ................................ 2019-131686

(51) Int. Cl.
*H04L 43/0823* (2022.01)
*H04L 12/40* (2006.01)
*H04L 12/66* (2006.01)

(52) U.S. Cl.
CPC .......... *H04L 43/0823* (2013.01); *H04L 12/40* (2013.01); *H04L 12/66* (2013.01)

(58) Field of Classification Search
None
See application file for complete search history.

(56) References Cited

U.S. PATENT DOCUMENTS

| 10,525,911 B2* | 1/2020 | Haga ................... B60R 16/0231 |
| 10,713,106 B2* | 7/2020 | Tanabe ................ G06F 11/0709 |
| 2014/0256278 A1 | 9/2014 | Ko et al. |
| 2014/0328352 A1 | 11/2014 | Mabuchi et al. |
| 2015/0113638 A1* | 4/2015 | Valasek ................. G06F 21/562 726/22 |
| 2016/0234037 A1 | 8/2016 | Mabuchi |
| 2018/0048663 A1* | 2/2018 | Yura .................... H04L 63/1425 |
| 2018/0148006 A1 | 5/2018 | Haga et al. |

(Continued)

FOREIGN PATENT DOCUMENTS

| JP | 2009-253557 A | 10/2009 |
| JP | 2015-080126 A | 4/2015 |

(Continued)

*Primary Examiner* — Derrick W Ferris
*Assistant Examiner* — Keith Follansbee
(74) *Attorney, Agent, or Firm* — Harness, Dickey & Pierce, P.L.C.

(57) ABSTRACT

A gateway apparatus is connected to a plurality of buses. A data frame is received by using one of the plurality of buses as a reception bus. Whether the received data frame is a monitoring target data frame is determined based on monitoring target information. The monitoring target information is stored in a storage to associate the monitoring target data frame with a monitoring target transmission source bus connected to a transmission source electronic control unit. Whether the reception bus matches the monitoring target transmission source bus is determined based on the monitoring target information in response to determining that the received data frame is a monitoring target data frame. An abnormality detection on the received data frame is performed in response to determining that the reception bus matches the monitoring target transmission source bus.

17 Claims, 10 Drawing Sheets

(56) References Cited

U.S. PATENT DOCUMENTS

| | | | |
|---|---|---|---|
| 2018/0234248 A1* | 8/2018 | Imamoto | H04L 12/40 |
| 2018/0316584 A1 | 11/2018 | Ujiie et al. | |
| 2019/0068407 A1* | 2/2019 | Haga | H04L 12/66 |
| 2020/0055470 A1 | 2/2020 | Haga et al. | |
| 2020/0120117 A1* | 4/2020 | Hong | H04L 12/4013 |
| 2021/0188201 A1 | 6/2021 | Haga et al. | |

FOREIGN PATENT DOCUMENTS

| | | |
|---|---|---|
| JP | 2017-050848 A | 3/2017 |
| JP | 2017-126978 A | 7/2017 |
| JP | 2017-126989 A | 7/2017 |
| WO | WO-2013094072 A1 | 6/2013 |

\* cited by examiner

FIG. 12

*703 – RECEIVE SCHEDULE INFO*

| ID | MONITOR TARGET | RELAY TARGET | TRANSMIT SOURCE BUS | TRANSMIT DESTINATION BUS |
|---|---|---|---|---|
| 0x100 | ● | ● | B | C |
| 0x200 |  | ● | C | B |
| 0x300 | ● |  | B |  |
| 0x400 |  | ● | B | C |
| 0x500 | ● |  | A |  |
| 0x600 |  |  | A |  |

GATEWAY APPARATUS, ABNORMALITY MONITORING METHOD, AND STORAGE MEDIUM

CROSS REFERENCE TO RELATED APPLICATION

The present application claims the benefit of priority from Japanese Patent Application No. 2019-131686 filed on Jul. 17, 2019. The entire disclosure of the above application is incorporated herein by reference.

TECHNICAL FIELD

The present disclosure relates to a gateway apparatus, which monitors a data frame, detects an abnormality in the data frame, and relays the data frame in a communication network to which a plurality of electronic control units are connected in a vehicle. The present disclosure also relates to an abnormality monitoring method and a storage medium.

BACKGROUND

A plurality of electronic control units (ECU: Electronic Control Unit) mounted on a vehicle are connected by a bus that is a common communication path in a communication network. Each electronic control unit exchanges information by exchanging data frames with other electronic control units via a bus.

For example, in a vehicle, a data frame including real-time control information that is control data for an engine, a transmission, etc. is regularly exchanged via a bus. As a result, smooth and safe vehicle control can be realized.

As described above, the connection by the bus is important for the information transmission of the ECU. However, if an unauthorized ECU is connected and an invalid data frame flows on the bus, such an invalid data frame may be processed as a legitimate data frame by mistake. This may involve a concern that causes erroneous recognition and malfunction on the ECU that receives the data frame.

Responsive thereto, techniques are known which monitor a data frame flowing through a bus and determine whether the data frame is correct/incorrect or normal/abnormal.

SUMMARY

According to an example of the present disclosure, a gateway apparatus connected to a plurality of buses is provided as follows. A data frame is received by using one of the plurality of buses as a reception bus. Whether the received data frame is a monitoring target data frame is determined based on monitoring target information. The monitoring target information is stored in a storage to associate the monitoring target data frame with a monitoring target transmission source bus connected to a transmission source electronic control unit. Whether the reception bus matches the monitoring target transmission source bus is determined based on the monitoring target information in response to determining that the received data frame is a monitoring target data frame. An abnormality detection on the received data frame is performed in response to determining that the reception bus matches the monitoring target transmission source bus.

BRIEF DESCRIPTION OF DRAWINGS

The objects, features, and advantages of the present disclosure will become more apparent from the following detailed description made with reference to the accompanying drawings. In the drawings:

FIG. 12 is a diagram illustrating an example of data frame information stored in a storage according to another embodiment of the present disclosure.

DETAILED DESCRIPTION

Hereinafter, configurations, functions, and operations of a communication system 1 and a gateway apparatus 100 of the present disclosure will be described with reference to the drawings.

When there are a plurality of embodiments, the configuration disclosed in each embodiment is not limited to each embodiment alone, and can be combined across the embodiments. For example, the configuration disclosed in one embodiment may be combined with another embodiment. Further, the disclosed configurations may be collected and combined in each of the plurality of embodiments.

1. Configuration Common to Respective Embodiments

Configuration of Communication System

Figures 1, 2:
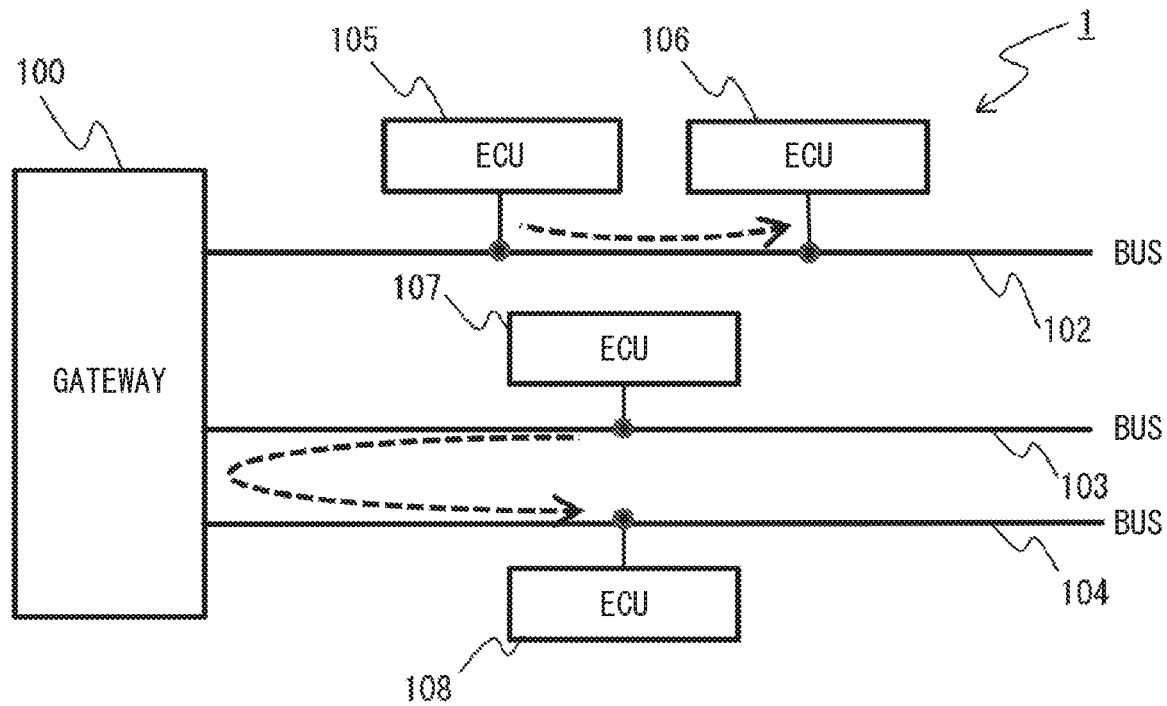
FIG. 1 is a diagram illustrating an example of a communication system common to embodiments of the present disclosure.
FIG. 2 is a diagram illustrating a relationship between a function of a gateway apparatus and a type of a data frame common to the embodiments of the present disclosure.

As shown in FIG. 1, in a communication system 1, a gateway apparatus 100 is connected to a plurality of buses 102, 103, and 104, and monitors and relays data frames.

Here, the "bus" may be a path for exchanging data between devices, and is not necessarily called a bus. For example, a "bus" includes a communication line, a communication link, a cable, and a network. A "data frame" is a data generated in a predetermined format; and is not necessarily called a frame. For example, a "data frame" includes a data packet, and a data block. A "gateway apparatus" only needs to have a function of relaying data frames between buses, and does not need to relay all received data frames.

In FIG. 1, the communication system 1 is assumed to be an in-vehicle system; the buses 102, 103, and 104 are buses in CAN (registered trademark, hereinafter omitted). The bus is not limited to CAN, and may be LIN, FlexRay (registered trademark), MOST (registered trademark), or any other vehicle-mounted bus.

In addition, the bus is not limited to an in-vehicle use, but may be a bus used for a general-purpose local network (LAN) such as Ethernet (registered trademark). Further, the bus may be a serial bus or a parallel bus. The bus is not limited to a wired system, but may be a wireless system. It is noted that the number of buses connected to the gateway apparatus 100 may be more than one and the number may be determined as needed.

In the example of the communication system 1 of FIG. 1, the ECU 105 and the ECU 106 are connected to the bus 102; the ECU 107 is connected to the bus 103; and the ECU 108 is connected to the bus 104. The gateway apparatus 100 is connected to all buses. Then, FIG. 1 shows an example in which the data frame is transmitted from the ECU 105 to the ECU 106 through the bus 102 without passing through the gateway apparatus 100. Further, an example is shown in which the data frame is transmitted from the ECU 107 to the ECU 108 through the bus 103 and the bus 104 via the gateway apparatus 100.

The gateway apparatus 100 has two functions of a monitoring function and a relay function.

The relay function is a function of transmitting a data frame to another bus connected to the electronic control unit which is the transmission destination when the data frame received via one bus is a relay target data frame. For example, since the data frame transmitted from the ECU 105 to the ECU 106 is not a relay target data frame, the gateway apparatus 100 does not relay the data frame. On the other hand, since the data frame transmitted from the ECU 107 to the ECU 108 is a relay target data frame, the gateway apparatus 100 relays the data frame.

The monitoring function is a function of detecting whether the data frame is normal or abnormal when the received data frame is a monitoring target data frame. As a first example, when the data frame transmitted from the ECU 105 to the ECU 106 is a monitoring target data frame, the gateway apparatus 100 performs an abnormality detection on the received data frame. As a second example, when the data frame transmitted from the ECU 105 to the ECU 106 is not a monitoring target data frame, the gateway apparatus 100 does not perform an abnormality detection on the received data frame. Since the data frame is not a relay target data frame in each of the first example and the second example, the gateway apparatus 100 discards the received data frame. As a third example, when the data frame transmitted from the ECU 107 to the ECU 108 is a monitoring target data frame, the gateway apparatus 100 performs an abnormality detection on the received data frame. As a fourth example, when the data frame transmitted from the ECU 107 to the ECU 108 is not a monitoring target data frame, the gateway apparatus 100 does not perform an abnormality detection on the received data frame. In each of the third example and the fourth example, since the data frame is a relay target data frame, the gateway apparatus 100 relays the received data frame.

FIG. 2 shows the relationship between the monitoring function and relay function of the gateway apparatus 100 and the type of data frame. If the data frame is a monitoring target, an abnormality detection is performed. If it is not a monitoring target, an abnormality detection is not performed. If the data frame is a relay target, it is relayed. If it is not a relay target, it is discarded without relaying.

In this way, the process performed by the gateway apparatus 100 differs depending on the type of data frame. There is no particular relation between (i) the data frame being a monitoring target data frame and (ii) the data frame being a relay target data frame, and these attributes can be set independently. Of course, these attributes may be associated. For example, a relay target frame may be set to be always a monitoring target frame.

It is assumed in FIG. 1 that the gateway apparatus 100, the ECU 105, the ECU 106, the ECU 107, and the ECU 108 are all mounted in a vehicle. However, some of them may be mounted in a vehicle and the rest may be provided outside the vehicle. As examples of an ECU outside the vehicle, one ECU may be connected to the gateway apparatus 100 via wireless communication; alternatively, an external device as an ECU used in a maintenance factory may be connected to the bus or the gateway apparatus 100 by wire.

The gateway apparatus 100 may be configured to include one or more special-purpose computers. Such a computer may be configured with dedicated hardware circuits. Alternatively, such a computer may be configured to include a CPU (Central Processing Unit), a volatile storage such as a RAM (Random Access Memory), a nonvolatile storage such as a mask ROM (Read Only Memory) and a flash memory, and a communication interface for connecting to a CAN bus. Such a gateway apparatus 100 may be a packaged semiconductor device or a configuration in which respective semiconductor devices are connected by wiring on a wiring board.

Each of the ECU 105, the ECU 106, the ECU 107, and the ECU 108 may be configured to include one or more special-purpose computers, like in the gateway apparatus 100. That is, such a computer may be configured with dedicated hardware circuits. Alternatively, such a computer may be configured to include a CPU (Central Processing Unit), a volatile storage such as a RAM (Random Access Memory), a nonvolatile storage such as a mask ROM (Read Only Memory) and a flash memory, and a communication interface for connecting to a CAN bus. Each ECU may be a packaged semiconductor device or a configuration in which respective semiconductor devices are connected by wiring on a wiring board.

2. First Embodiment

Configuration of Gateway Apparatus According to First Embodiment

Figure 3:
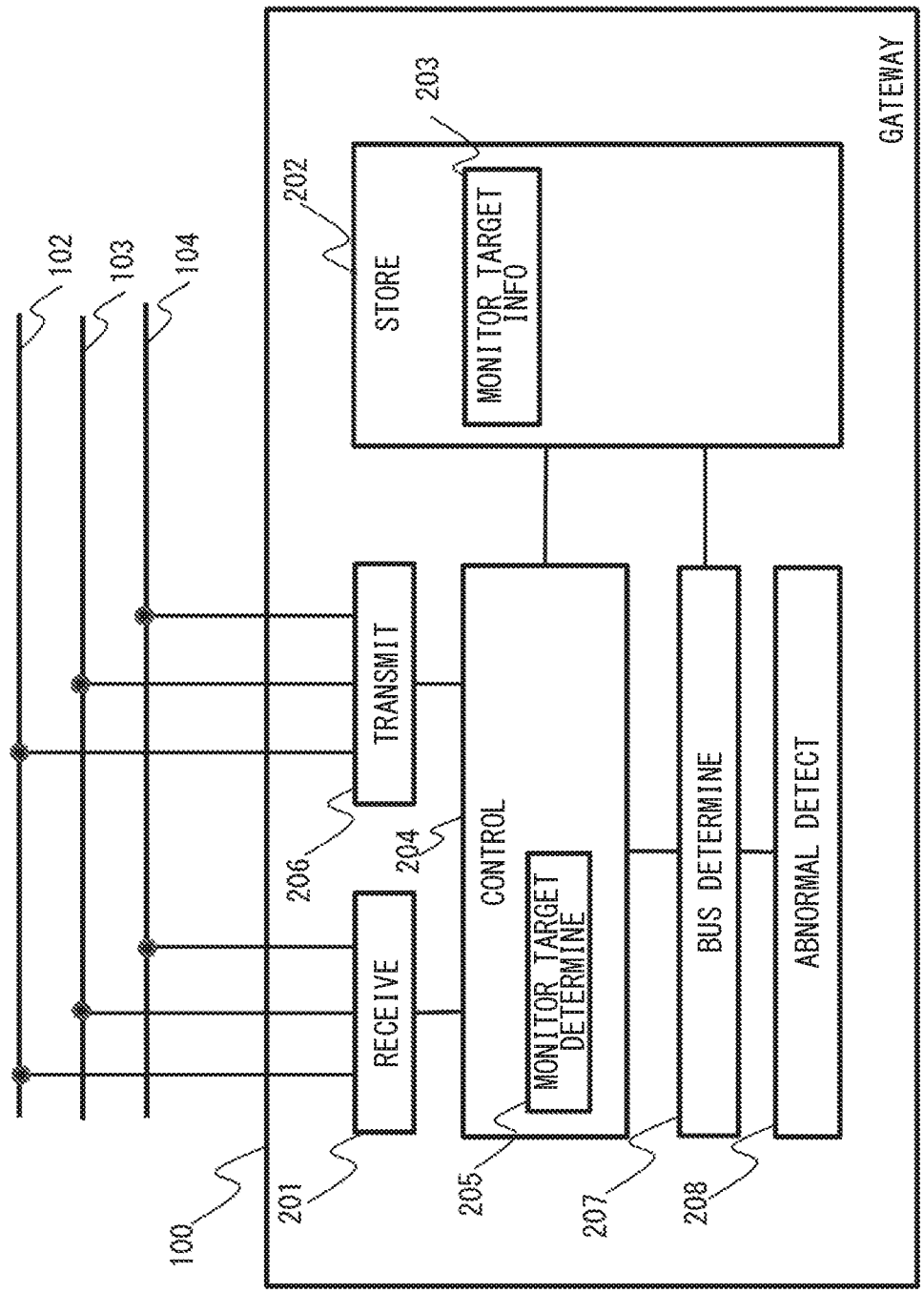
FIG. 3 is a diagram illustrating a configuration example of a gateway apparatus according to a first embodiment of the present disclosure.

As illustrated in FIG. 3, the gateway apparatus 100 includes a receiver 201, a storage 202, a controller 204, a transmitter 206, a bus determination unit 207, and an abnormality detection unit 208.

The receiver 201 is connected to the buses 102, 103, and 104, which are a plurality of buses, and receives a data frame from one of these buses. That is, when focusing on a specific data frame, the data frame is received by using the bus 102, the bus 103, or the bus 104 as a reception bus.

Figure 4:
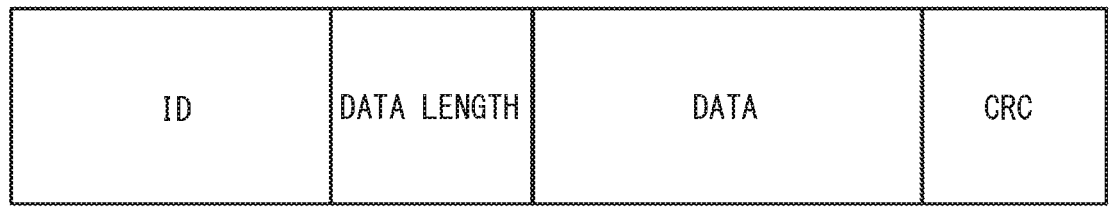
FIG. 4 is a diagram illustrating an example of a data frame received by a receiver in the gateway apparatus according to the first embodiment of the present disclosure.

FIG. 4 shows a CAN data frame which is an example of the data frame. The CAN data frame is composed of four fields of an identifier (ID), a data length, a data, and a CRC. The identifier (ID) identifies a type of data. For example, the identifier identifies specific data types used for controlling a power transmission system such as an accelerator and a brake, an information system such as a navigation system, and a body system such as doors and mirrors. The data length indicates the length of a data. A data is specific information that can be defined by the user. CRC (Cyclic Redundancy Check) is an error detection code.

The storage 202 is configured to store monitoring target information 203 in which a monitoring target data frame that is a monitoring target is associated with a monitoring target transmission source bus connected to a transmission source electronic control unit that transmits the monitoring target data frame. The storage 202 may be a volatile storage such as a RAM or a non-volatile storage such as a mask ROM or a flash memory.

Here, the "transmission source electronic control unit" refers to a device that transmits a data frame. The transmission source electronic control unit includes a device that generates and transmits the data frame, and a device acquires and transmits the data frame. Further, "associated" only means that the correspondence between (i) the monitoring target data frame and (ii) the monitoring target transmission source bus can be specified. The association between the frame and the bus may be direct or indirect.

Figure 5:
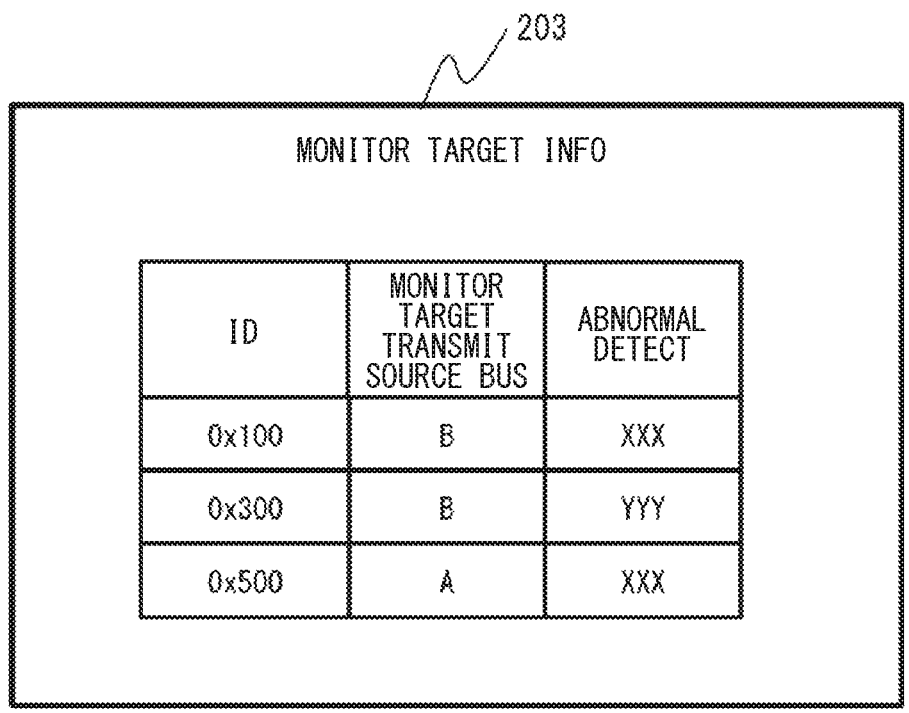
FIG. 5 is a diagram illustrating an example of monitoring target information stored in a storage according to the first embodiment of the present disclosure.

FIG. 5 shows a specific example of the monitoring target information 203. The monitoring target information 203 includes an identifier (ID) of a monitoring target data frame, a monitoring target transmission source bus, and an abnormality detection method.

The identifier (ID) of a monitoring target data frame identifies a data frame to be monitored by the gateway apparatus 100. For example, important data such as vehicle control data that is regularly or preferentially transmitted and received and data that is related to driver safety can be set as a monitoring target data frame. According to the example of FIG. 5, data frames whose identifiers (ID) are 0x100, 0x300, and 0x500 are set as monitoring target data frames.

The monitoring target transmission source bus is a bus connected to a transmission source electronic control unit that transmits a monitoring data frame. In other words, the monitoring target transmission source bus matches the bus on which the gateway apparatus 100 should receive a normal monitoring target data frame. In the example of FIG. 5, bus names are assigned when the three buses connected to the gateway apparatus 100 in FIG. 3 are bus A, bus B, and bus C.

The abnormality detection method specifies an abnormality detection method that the abnormality detection unit 208 specifically executes. For example, it is possible to specify a monitoring method such as periodic monitoring or frequency monitoring, a message authentication code, and an encryption key such as a public key or a secret key.

The controller 204 may be provided as one or more controllers 204 to provide a plurality of functions and may be provided as the above-described one or more special-purpose computers included in the gateway apparatus 100. The controller 204 is connected with the receiver 201, the transmitter 206, and the storage 202. The controller 204 (i.e., one or more controllers 204) includes a monitoring target determination unit 205 as one function. The monitoring target determination unit 205 determines whether the data frame received by the receiver 201 is a monitoring target data frame, based on "monitoring target information 203". For example, by comparing the identifier (ID) of the data frame received by the receiver 201 with the identifier (ID) stored in the monitoring target information 203, whether the received data frame is the monitoring target data frame or not is determined.

Here, "based on the monitoring target information" may refer to the monitoring target information, and may refer to all of the monitoring target information or a part thereof.

The transmitter 206 is connected to the buses 102, 103, and 104, which are a plurality of buses, and transmits a data frame to these buses. More specifically, when relaying a received data frame based on the relay function of the gateway apparatus 100, the received data frame is transmitted to the transmission destination electronic control unit via a transmission bus that is a bus different from the reception bus.

The bus determination unit 207 may be provided to be included in the above-described one or more special-purpose computers included in the gateway apparatus 100, or may be provided to be included in the controller 204 (i.e., one or more controllers 204). The bus determination unit 207 determines whether the reception bus matches the monitoring target transmission source bus "based on the monitoring target information 203", in response to that monitoring target determination unit 205 determines that the received data frame is a monitoring target data frame. For example, the bus determination unit 207 determines whether the reception bus matches the monitoring target transmission source bus associated with the monitoring target data frame having the identifier (ID) of the received data frame. If the reception bus matches the monitoring target transmission source bus, the abnormality detection unit 208 described below performs an abnormality detection. If the reception bus does not match the monitoring target transmission source bus, the data frame can be determined to be abnormal without need of the determination by the abnormality detection unit 208.

The abnormality detection unit 208 may be provided to be included in the above-described one or more special-purpose computers included in the gateway apparatus 100, or may be provided to be included in the controller 204 (i.e., one or more controllers 204). The abnormality detection unit 208 performs an abnormality detection on the data frame received by the receiver 201 in response to that the bus determination unit 207 determines that the reception bus matches the monitoring target transmission source bus. Any detection method can be used for the abnormality detection. Also, the same detection method may be used regardless of the type of data frame, or a different detection method may be used depending on the type of data frame. In the present embodiment, the abnormality detection is performed using the abnormality detection method corresponding to the identifier (ID) of the data frame in the monitoring target information 203. For example, when performing an authentication process using a message authentication code, a shared key is shared in advance between the transmission source ECU and the gateway apparatus 100. The transmission source ECU transmits a hash value obtained by applying the shared key to the data of the data frame, as a MAC (Message Authentication Code) value. The MAC value obtained by the gateway apparatus 100 by the same method is compared with the MAC value transmitted by the transmission source ECU. If the MAC values are different, it may be determined to be abnormal.

If the received data frame is determined to be abnormal by the abnormality detection unit 208, or if the bus determination unit 207 determines that the received data frame is abnormal, an abnormality handling unit may be provided in the subsequent stage to perform an abnormality handling process. Examples of the abnormality handling process may include (i) that the data frame determined to be abnormal is discarded, (ii) the electronic control unit receiving the data frame determined to be abnormal is notified of the abnormality, and (iii) a log indicating that the data frame determined to be abnormal is abnormal is recorded or left.

Further, suppose the received data frame is determined to be normal by the abnormality detection unit 208, or the received data frame is not a monitoring target data frame. In such cases, if the data frame is a relay target data frame, the data frame is relayed; if the data frame is not a relay target data frame, the data frame is discarded.

With the above configuration, the bus determination unit 207 can determine that the data frame is abnormal when the reception bus of the received monitoring target data frame does not match the monitoring target transmission source bus. Therefore, it is not necessary to perform an abnormality detection for the data frame, and the load on the abnormality detection unit 208 can be reduced.

Operation of Gateway Apparatus According to First Embodiment

Figure 6:
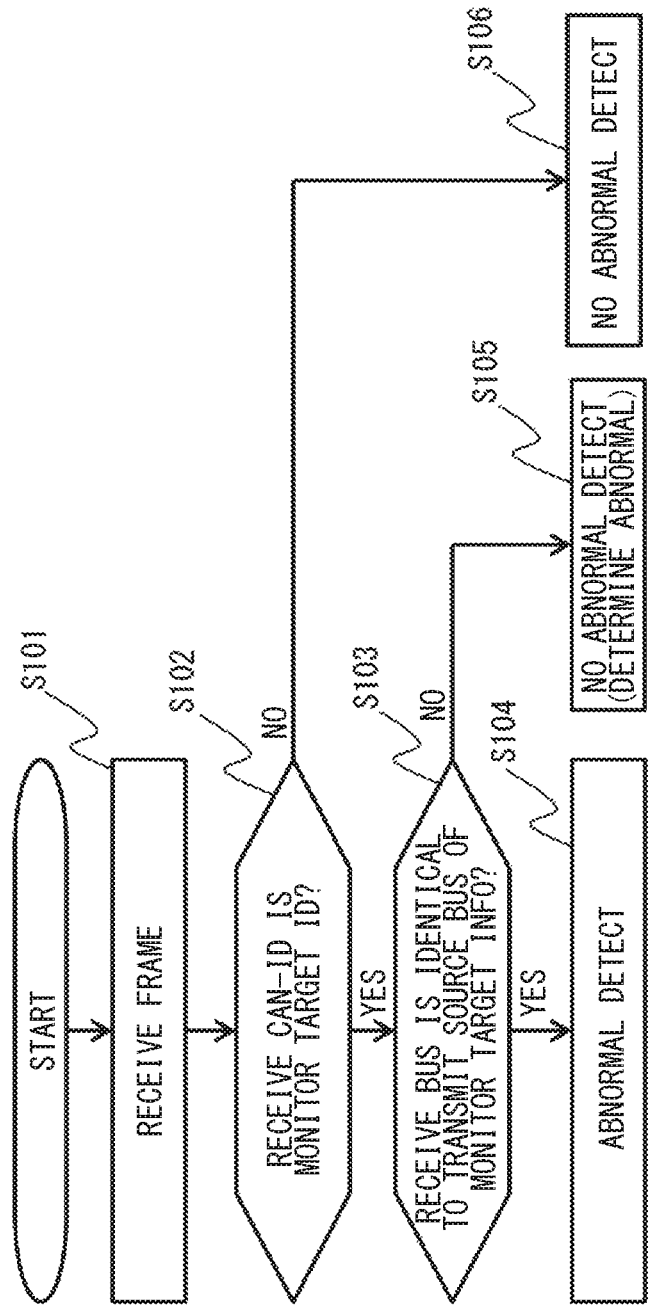
FIG. 6 is a flowchart of an abnormality monitoring process in the gateway apparatus according to the first embodiment of the present disclosure.

The operation of the gateway apparatus 100 will be described with reference to the flowchart of FIG. 6. Note that the following operation not only shows the abnormality monitoring method in the gateway apparatus 100, but also shows the processing procedure of the abnormality monitoring program executed in the gateway apparatus 100. The same applies to the flowcharts of the embodiments below.

In step S101, the receiver 201 receives a data frame by using one of the buses 102, 103, and 104 as a reception bus. At this time, the identifier (ID) of the received data frame and the information specifying the reception bus that received the data frame are acquired and stored.

In step S102, the monitoring target determination unit 205 compares the identifier (ID) of the received data frame with the identifier (ID) stored in the monitoring target information 203 in the storage 202, thereby determining whether the data frame is a monitoring target data frame.

When the received data frame is the monitoring target data frame (S102: y), the process proceeds to step S103. In step S103, the bus determination unit 207 compares the reception bus with the monitoring source transmission source bus corresponding to the identifier (ID) of the data frame stored in the monitoring target information 203, thereby determining whether the two match.

When the reception bus and the monitoring target transmission source bus match (S103: y), the abnormality detection unit 208 performs an abnormality detection process on the data frame in S104. If the result of the abnormality detection process indicates that an abnormality has occurred, a predetermined abnormality handling process is performed as described above. If the result of the abnormality detection process indicates that the data frame is normal, the data frame is relayed or discarded depending on whether the data frame is a relay target data frame or not. That is, when the data frame is a relay target data frame, the relay is performed. If the data frame is not a relay target data frame, there is no need to perform any further process in the gateway apparatus 100, and therefore the process for discarding the data frame is performed.

If the received data frame is not a monitoring target data frame (S102: n), no particular abnormality detection process is performed in step S106. Then, similar to the description in S104, the data frame is relayed or discarded depending on whether the data frame is a relay target data frame.

When the reception bus and the monitoring target transmission source bus do not match (S103: n), it can be determined that the data frame is abnormal. Therefore, in S105, the data frame is determined to be abnormal without need of performing an abnormality detection process, and a predetermined abnormality handling process is performed.

By the above operation, when the reception bus of the received monitoring target data frame does not match a monitoring target transmission source bus, it can be determined that the data frame is abnormal, Therefore, it is not necessary to perform an abnormality detection process on the data frame, and the load of the abnormality detection process can be reduced.

3. Second Embodiment

Configuration of Gateway Apparatus According to Second Embodiment

Figure 7:
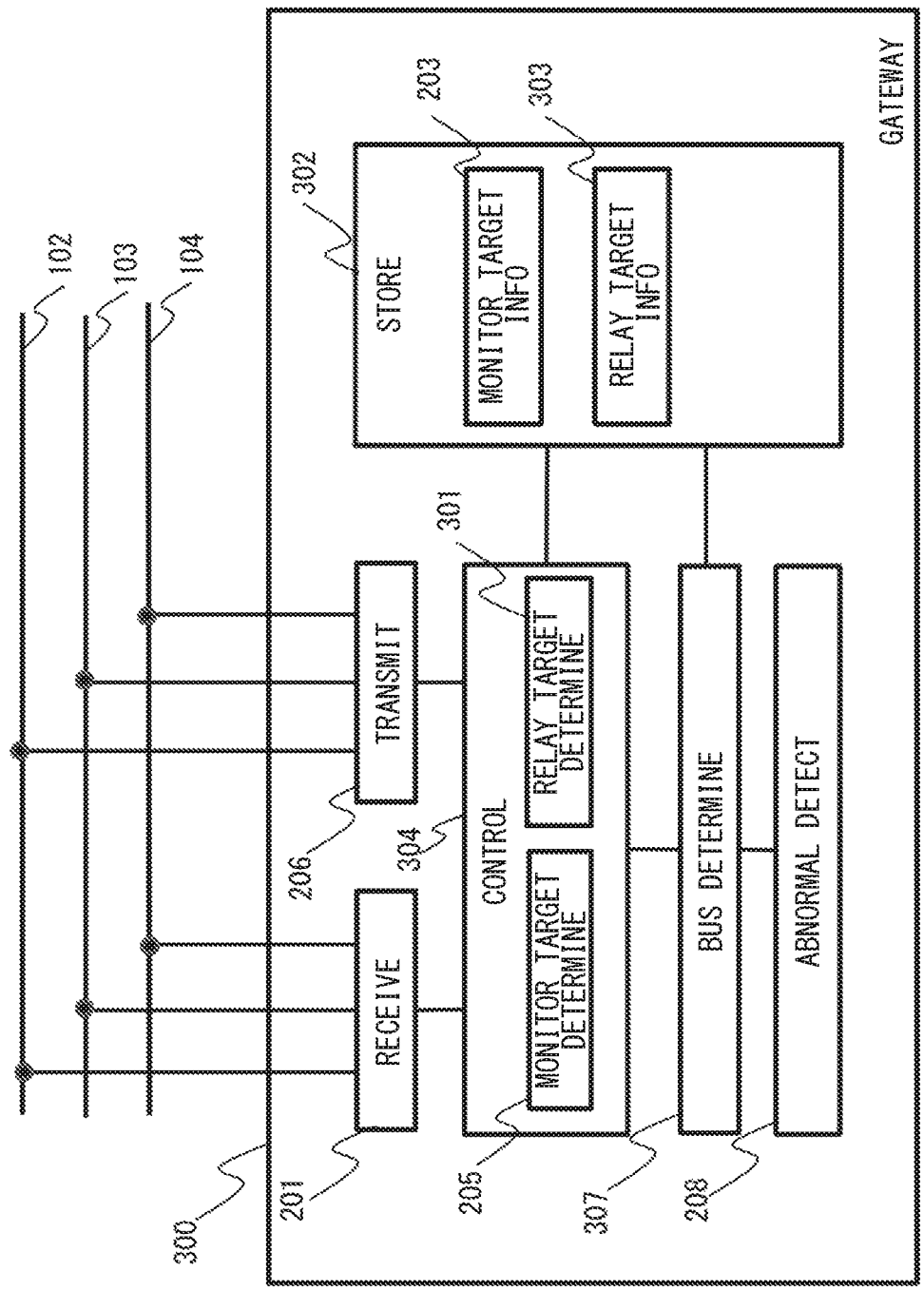
FIG. 7 is a diagram illustrating a configuration example of a gateway apparatus according to a second embodiment of the present disclosure.

FIG. 7 shows a configuration example of the gateway apparatus 300 according to a second embodiment of the present disclosure. The gateway apparatus 300 according to the second embodiment is different from the gateway apparatus 100 of the first embodiment shown in FIG. 3, in that (i) the storage 302 further stores relay target information 303, (ii) the controller 304 further includes a relay target determination unit 301, and (iii) the function of the bus determination unit 307 is different. The same components as those in the first embodiment are designated by the same reference numerals as those in FIG. 3, and description thereof will be omitted as appropriate.

In addition to the monitoring target information 203, the storage 302 further stores relay target information 303, In the relay target information 303, (i) a relay target data frame that is a relay target, and (ii) a relay target transmission source bus connected to a "transmission source electronic control unit" that transmits a relay target data frame are "associated" with each other.

Figure 8:
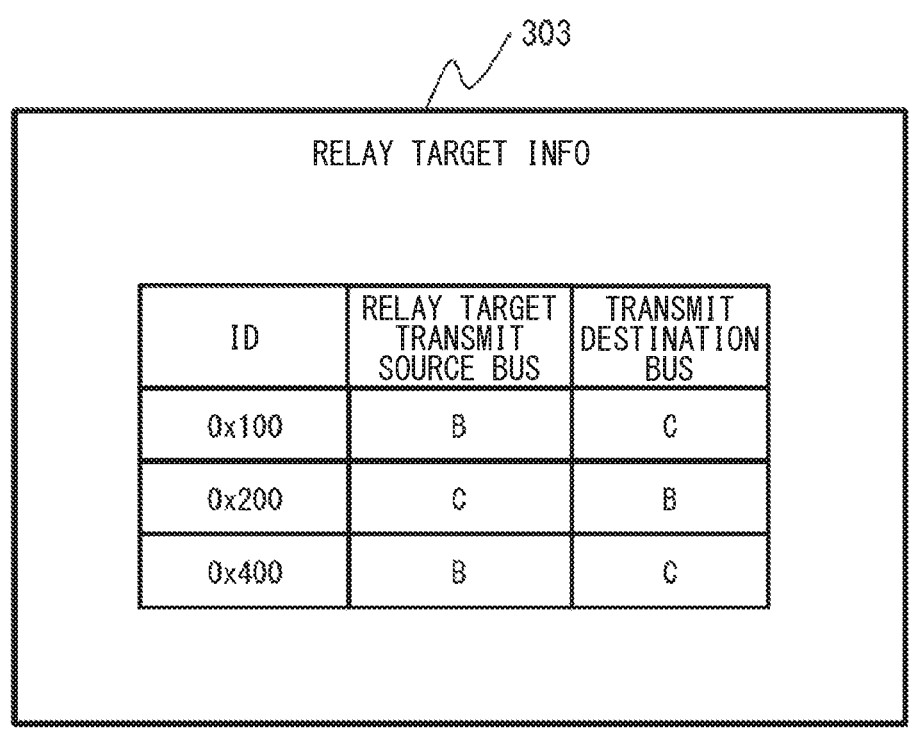
FIG. 8 is a diagram illustrating an example of relay target information stored in a storage according to the second embodiment of the present disclosure.

FIG. 8 shows a specific example of the relay target information 303.

The relay target information 303 includes (i) an identifier (ID) of a relay target data frame, (ii) a relay target transmission source bus, and (iii) a transmission destination bus.

The identifier (ID) of a relay target data frame identifies the data frame to be relayed by the gateway apparatus 300. According to the example of FIG. 8, data frames whose identifiers (ID) are 0x100, 0x200, and 0x400 are set as relay target data frames.

The relay source transmission source bus is a bus connected to a transmission source electronic control unit that transmits a relay target data frame. That is, the relay source transmission source bus matches the bus via which the normal relay target data frame should be received by the gateway apparatus 300. In the example of FIG. 8, bus names are set when the three buses connected to the gateway apparatus 300 in FIG. 7 are bus A, bus B, and bus C.

The transmission destination bus is a bus connected to a transmission destination electronic control unit that receives the relay target data frame. The gateway apparatus 300 outputs the received relay target data frame to the transmission destination bus.

The controller 304 further includes a relay target determination unit 301 in addition to the monitoring target determination unit 205. The relay target determination unit 301 determines whether the data frame received by the receiver 201 is a relay target data frame "based on the relay target information 303". For example, the identifier (ID) of the data frame received by the receiver 201 is compared with the identifier (ID) stored in the relay target information 303. Accordingly, it is determined whether the received data frame is a relay target data frame. In the example of FIG. 8, when the identifier (ID) of the received data frame is 0x100, 0x200, or 0x400, it is determined that the received data frame is a relay target data frame.

Here, "based on the relay target information" may refer to the relay target information, and may refer to a part of the relay target information as well as the entire relay target information.

The bus determination unit 307 determines that the data frame received by the relay target determination unit 301 is a relay target data frame. In this case, based on "relay target information 303", it is determined whether the reception bus and the relay target transmission source bus match. If the reception bus does not match the relay target transmission source bus, the data frame is determined to be abnormal and is discarded.

With the above configuration, the bus determination unit 307 can determine that the data frame is abnormal when the reception bus of the received relay target data frame does not match the relay target transmission source bus. Therefore, even if the data frame is a monitoring target data frame, it can be determined that the data frame is abnormal without need of the determination by the abnormality detection unit 208 in the subsequent step. Therefore, the abnormality detection unit 208 does not need to perform an abnormality detection on the data frame, and the load on the abnormality detection unit can be reduced.

Operation of Gateway According to Second Embodiment

Figure 9:
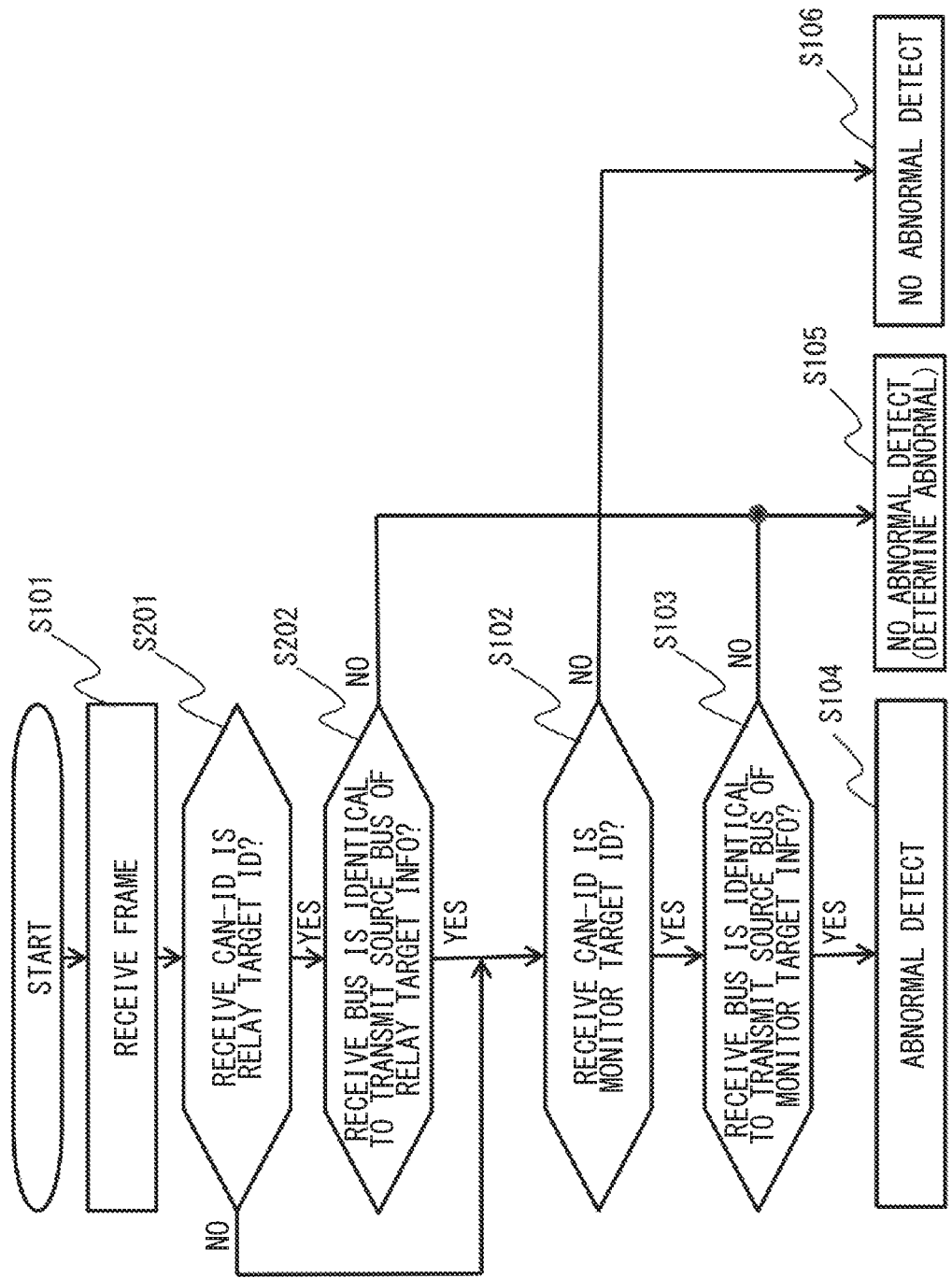
FIG. 9 is a flowchart of an abnormality monitoring process in the gateway apparatus according to the second embodiment of the present disclosure.

The operation of the gateway apparatus 300 according to the second embodiment will be described with reference to the flowchart of FIG. 9. The same steps as those in FIG. 6 are designated by the same reference numerals, and the description thereof will be appropriately omitted.

In step S201, the relay target determination unit 301 compares the identifier (ID) included in the received data frame with the identifier (ID) stored in the relay target information 303, thereby determining whether the data frame is a relay target data frame.

When the received data frame is the relay target data frame (S201: y), the process proceeds to step S202. In step S202, the bus determination unit 307 compares the reception bus with the relay target transmission source bus corresponding to the identifier (ID) of the data frame stored in the relay target information 303.

Suppose that the received data frame is not the relay target data frame (S201: n), or that the reception bus matches the relay target transmission source bus corresponding to the identifier (ID) of the data frame (S202: y). In such cases, the process proceeds to step S102, and the following operation is the same as the operation of the gateway apparatus 100 according to the first embodiment.

When the reception bus does not match the relay target transmission source bus corresponding to the identifier (ID) of the data frame (S202: n), the abnormality detection process is not performed and the process proceeds to step S105.

When the bus determination unit 307 compares the reception bus with the relay source transmission source bus in S202, the bus determination unit 307 does not need to compare the reception bus with the monitoring target transmission source bus in S103.

Through the above operation, when the reception bus related to the received relay target data frame does not match the relay target transmission source bus, it can be determined that the data frame is abnormal. Therefore, even if the data frame is a monitoring target data frame, it is not necessary to perform an abnormality detection process on the data frame, and the load of the abnormality detection process can be reduced.

4. Other Embodiments

Embodiment Only for Determination of Relay Target

Figure 10:
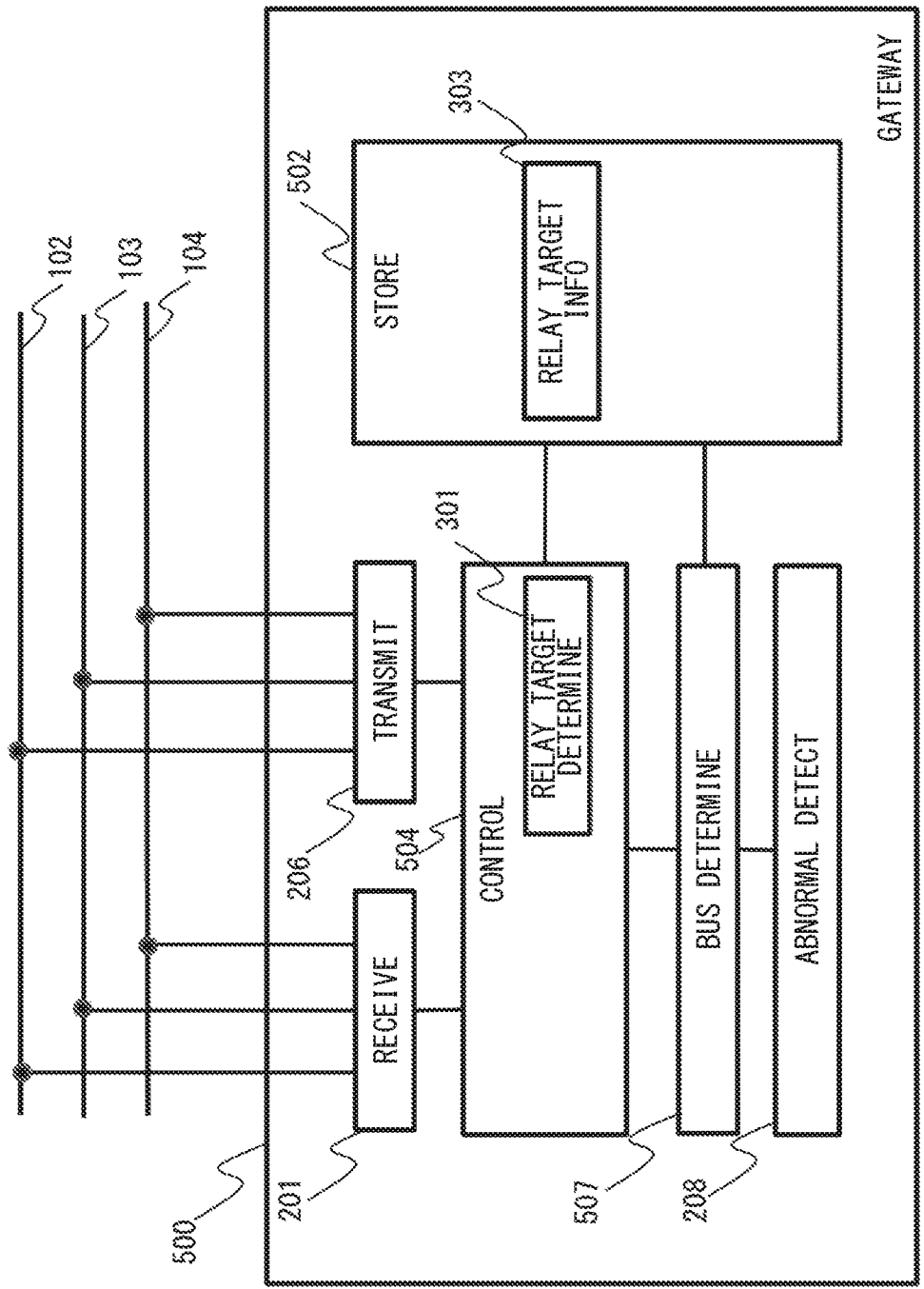
FIG. 10 is a diagram illustrating a configuration example of a gateway apparatus according to another embodiment of the present disclosure.

FIG. 10 shows a configuration example of the gateway apparatus 500 according to another embodiment. The gateway apparatus 500 shown in FIG. 10 is obtained by omitting the monitoring target determination unit 205 and the monitoring target information 203 from the gateway apparatus 300 of the second embodiment shown in FIG. 7. That is, it is not determined whether the received data frame is a monitoring target data frame. Further, whether the abnormality detection unit 208 performs an abnormality detection is determined as needed. Regarding the function and operation of each block, the description of the corresponding first and second embodiments is cited.

An example supported by this embodiment is as follows, A gateway apparatus 500 connected to a plurality of buses to monitor and relay data frames is provided to include a receiver 201, a storage 502, a relay target determination unit 301, and a bus determination unit 507. The receiver 201 is configured to receive a data frame using one of the plurality of buses as a reception bus. The storage 502 is configured to store relay target information 303, in which a relay target data frame that is a relay target is associated with a relay target transmission source bus connected to a transmission source electronic control unit that transmits the relay target data frame. The relay target determination unit 301 is configured to determine whether the data frame received by the receiver is the relay target data frame based on the relay target information. The bus determination unit 507 is configured to determine whether the reception bus matches the relay target transmission source bus based on the relay target information in response to the relay target determination unit determining that the data frame is the relay target data frame. In response to the bus determination unit 507 determining that the reception bus does not match the relay target transmission source bus, the data frame is determined to be abnormal.

Figure 11:
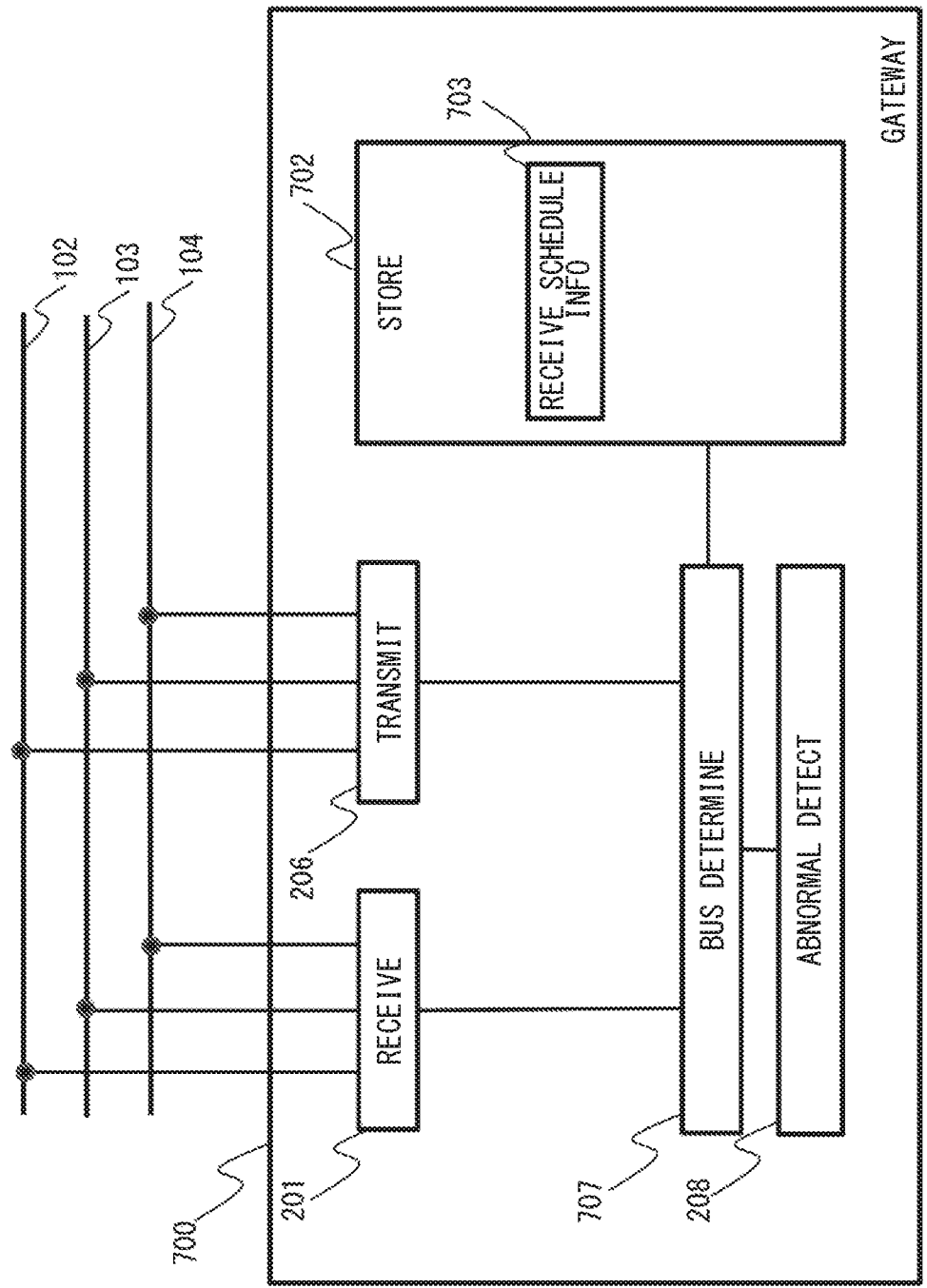
FIG. 11 is a diagram illustrating a configuration example of a gateway apparatus according to another embodiment of the present disclosure.

Embodiment in which Neither Monitoring Target Determination Nor Relay Target Determination is Performed FIG. 11 shows a configuration example of the gateway apparatus 700 according to this embodiment. The gateway apparatus 700 shown in FIG. 11 is different from the gateway apparatus 300 of the second embodiment shown in FIG. 7 in that the monitoring target determination unit 205, the relay target determination unit 301, the controller 304, the monitoring target information 203, and the relay target information 303 are omitted from the gateway apparatus 300 of the second embodiment (it is noted that the bus determination unit 707 and the abnormality detection unit 208 may be provided to be included in a controller). That is, it is not determined whether the received data frame is a monitoring target data frame. In addition, it is not determined whether the received data frame is a relay target data frame. In the present embodiment, the storage 702 stores the reception schedule information 703. Whether the abnormality detection unit 208 performs an abnormality detection may be determined as needed. For the functions and operations of the blocks common to the first and second embodiments, the description of the corresponding first and second embodiments is cited.

FIG. 12 shows an example of the reception schedule information 703. The storage 702 stores reception schedule information 703 which associates, with each other, (i) a schedule data frame that the gateway apparatus 700 may receive and (ii) a transmission source bus connected to the transmission source electronic control unit that transmits the reception schedule data frame. In the present embodiment, the reception schedule information 703 associates (i) an identifier (ID) of a scheduled reception data frame, (ii) a flag indicating whether the scheduled reception data frame is a monitoring target or a relay target, (iii) a transmission source bus of the scheduled reception data frame, and (iv) a transmission destination bus of the scheduled reception frame, with each other.

The bus determination unit 707 determines whether the reception bus of the data frame received by the receiver 201 matches the transmission source bus "based on the reception schedule information 703", For example, the identifier (ID) of the data frame received by the receiver 201 is compared with the identifier (ID) stored in the reception schedule information 703 to identify the corresponding transmission source bus. Then, it is determined whether the reception bus and the transmission source bus match. If the reception bus and the transmission source bus do not match, the data frame is determined to be abnormal and is discarded. If the reception bus and the transmission source bus match, an abnormality detection and a relay are performed according to the flags of the monitoring target and the relay target, respectively.

An example supported by this embodiment is as follows, A gateway apparatus 700 connected to a plurality of buses to monitor and relay data frames is provided to include a receiver 201, a storage 702, and a bus determination unit 707. The receiver 201 is configured to receive a data frame using one of the plurality of buses as a reception bus. The storage 702 is configured to store reception schedule information 703 in which (i) a reception scheduled data frame that may be received by the gateway apparatus and (ii) a transmission source bus connected to the transmission source electronic control unit that transmits the reception scheduled data frame are associated with each other. The bus determination unit 707 is configured to determine whether the reception bus and the transmission source bus match based on the reception schedule information. In response to the bus determination unit determining that the reception bus does not match the transmission source bus, the data frame is determined to be abnormal.

Overview

The features of the gateway apparatus, the abnormality monitoring method, and the storage medium according to each embodiment of the present disclosure have been described above.

Terms used in the description of each embodiment are examples and may be replaced with synonymous terms or terms having a synonymous function.

The block diagram used in the description of each embodiment is a diagram in which the configurations of devices and the like are classified and organized by function. These functional blocks are realized by any combination of hardware or software. Further, since the functions are shown, the block diagram can be understood as disclosure of the method and the program that implements the method.

Order of functional blocks that can be grasped as processing, a sequence, and a method described in relation to each embodiment may be changed unless some restriction is imposed, for example, a result from one step is utilized at another step.

The terms "first", "second", or "N" (N is an integer) used in each embodiment and the present disclosure are used to distinguish two or more configurations and methods of the same type, it does not limit the order or superiority.

One or more controllers 204, 304, 504 included in the gateway apparatus 100, 300, 500, 700 in the above embodiments may be implemented by one or more special-purpose computers. Such computers may be created (i) by configuring (a) a memory and a processor programmed to execute one or more particular functions embodied in computer programs, or (ii) by configuring (b) a processor provided by one or more dedicated hardware logic circuits, or (iii) by configuring a combination of (a) a memory and a processor programmed to execute one or more particular functions embodied in computer programs and (b) a processor provided by one or more dedicated hardware logic circuits. The computer programs may be stored, as instructions being executed by a computer, in a tangible non-transitory computer-readable storage medium.

A programs stored in a dedicated or general-purpose hardware storage medium (external storage device (hard disk, USB memory, CD/BD, etc.), or internal storage (RAM, ROM, etc.) may be provided to a dedicated or general-purpose hardware from a server via a communication line with or without using a storage medium. Consequently, when the program is upgraded, the latest function is always provided. A special-purpose or general-purpose hardware storage medium and an internal storage are examples of a computer-readable non-transitory tangible storage medium.

The gateway apparatus of the present disclosure has been described as a gateway apparatus used in a communication system for a vehicle mainly used in an automobile. However, it is not limited to a vehicle, and can be applied to a gateway apparatus used for various purposes.

For reference to further explain features of the present disclosure, the description is added as follows.

A plurality of electronic control units (ECU: Electronic Control Unit) mounted on a vehicle are connected by a bus that is a common communication path in a communication network. Each electronic control unit exchanges information by exchanging data frames with other electronic control units via a bus.

For example, in a vehicle, a data frame including real-time control information that is control data for an engine, a transmission, etc. is regularly exchanged via a bus. As a result, smooth and safe vehicle control can be realized.

As described above, the connection by the bus is important for the information transmission of the ECU. However, if an unauthorized ECU is connected and an invalid data frame flows on the bus, such an invalid data frame may be processed as a legitimate data frame by mistake. This may involve a concern that causes erroneous recognition and malfunction on the ECU that receives the data frame.

Responsive thereto, techniques are to monitor a data frame flowing through a bus and determine whether the data frame is correct/incorrect or normal/abnormal.

For instance, a technique is to monitor the data frames that are communicated on the CAN bus; to calculate the communication interval of the data frames having the same ID (identifier) among the plurality of received data frames; and to determine normality/abnormality of a frame based on a comparison between the calculated communication interval and a communication interval defined in advance (period monitoring).

Further, another technique is to determine an abnormality in a data frame based on the number of appearances (frequency) of the data frame in a unit time (frequency monitoring), instead of determining the abnormality only by the communication interval of the data frame as described above.

A communication system that performs an abnormality detection process by period monitoring or frequency monitoring of the data frame is effective for determining an anomaly in a received data frame.

In order to efficiently monitor the data frame, it is desirable to monitor the data frame with a gateway apparatus connected to a plurality of buses and relaying the data frame. However, if the gateway apparatus performs an abnormality detection process for all monitored data frames, the gateway apparatus needs to perform, for all monitored data frames, various processes such as a process for obtaining the difference in reception time for period monitoring and frequency monitoring, a process for counting the number of data frames, and the like. The processing load of the hardware and software in the gateway apparatus may thus become heavy.

It is thus desired to provide a gateway apparatus, an abnormality monitoring method, and a storage medium, which reduce the load of processing of hardware or software when performing an abnormality detection process of a data frame.

An aspect of the present disclosure described herein is set forth in the following clauses.

To achieve the above object, according to an aspect of the present disclosure, a gateway apparatus connected to a plurality of buses to monitor and relay data frames is provided to include a receiver, a storage, a monitoring target determination unit, a bus determination unit, and an abnormality detection unit. The receiver is configured to receive a data frame by using one of a plurality of buses as a reception bus. The storage is configured to store monitoring target information in which a monitoring target data frame that is a monitoring target is associated with a monitoring target transmission source bus connected to a transmission source electronic control unit that transmits the monitoring target data frame. The monitoring target determination unit is configured to determine whether the received data frame is the monitoring target data frame. The bus determination unit is configured to determine whether the reception bus matches the monitoring target transmission source bus in response to the received data frame being determined to be the monitoring target data frame. The abnormality detection unit is configured to perform an abnormality detection on the data frame in response to the reception bus being determined to match the monitoring target transmission source bus.

With the above-described configuration, the gateway apparatus performs an abnormality detection on the data frame when the bus determination unit determines that the reception bus match the monitoring target transmission source bus. It is therefore unnecessary to perform an abnormality detection for all of the monitored data frames. This can reduce the load associated with the processing in the abnormality detection.

What is claimed is:

1. A computer-implemented abnormality monitoring method performed by a computer in a gateway apparatus connected to a plurality of buses, the method comprising:
receiving a data frame by using a reception bus that is one of the plurality of buses;
determining whether the received data frame includes an identifier that is designated for monitoring based on monitoring target information stored in the gateway apparatus, the monitoring target information including a plurality of frame identifiers designated for monitoring and a monitoring target transmission source bus designated for each frame identifier of the plurality of frame identifiers;
in response to determining that the identifier of the data frame is designated for monitoring:
 (i) determining a particular monitoring target transmission source bus designated for the identifier within the monitoring target information;
 (ii) determining whether the reception bus matches the particular monitoring target transmission source bus designated for the identifier within the monitoring target information;
 (iii) performing abnormality detection on the data frame to authenticate the data frame in response to determining that the reception bus matches the particular monitoring target transmission source bus; and
 (iv) performing a predetermined abnormality handling process on the data frame, without performing the abnormality detection, based on determining that the data frame is abnormal in response to determining that the reception bus does not match the particular monitoring target transmission source bus; and
in response to determining that the identifier of the data frame is not designated for monitoring: (v) relaying the data frame to a transmission destination when the data frame is a relay target data frame; and (vi) discarding the data frame when the data frame is not the relay target data frame.

2. A non-transitory computer readable storage medium storing a computer program executable by a computer to perform the computer-implemented abnormality monitoring method according to claim 1.

3. The computer-implemented abnormality monitoring method recited by claim 1, wherein performing the abnormality detection on the data frame to authenticate the data frame includes receiving a message authentication code for the data frame, obtaining a hash value by applying a shared key to data of the data frame, comparing the obtained hash value with the received message authentication code, and authenticating the data frame in response to the obtained hash value matching the received message authentication code.

4. A gateway apparatus connected to a plurality of buses to monitor and relay data frames, comprising:
a receiver configured to receive a data frame using a reception bus that is one of the plurality of buses;
a storage configured to store monitoring target information that includes a plurality of frame identifiers designated for monitoring and a monitoring target transmission source bus designated for each frame identifier of the plurality of frame identifiers; and
one or more controllers communicably connected with the receiver and the storage, the one or more controllers being configured
to determine whether the data frame received by the receiver includes an identifier that is designated for monitoring based on the monitoring target information stored in the storage, in response to determining that the identifier of the data frame is designated for monitoring:
  (i) to determine a particular monitoring target transmission source bus designated for the identifier,
  (ii) to determine whether the reception bus matches the particular monitoring target transmission source bus designated for the identifier within the monitoring target information,
  (iii) to perform abnormality detection on the data frame to authenticate the data frame in response to determining that the reception bus matches the particular monitoring target transmission source bus, and
  (iv) to perform a predetermined abnormality handling process on the data frame, without performing the abnormality detection, based on determining that the data frame is abnormal in response to determining that the reception bus does not match the particular monitoring target transmission source bus; and
in response to determining that the identifier of the data frame is not designated for monitoring: (v) to relay the data frame to a transmission destination when the data frame is a relay target data frame, and (vi) to discard the data frame when the data frame is not the relay target data frame.

5. The gateway apparatus according to claim 4, wherein:
the storage is configured to further store relay target information that includes a plurality of frame identifiers designated for relay and a relay target transmission source bus designated for each frame identifier of the plurality of frame identifiers designated for relay;
the one or more controllers are configured to determine whether the identifier of the data frame received by the receiver is designated for relay based on the relay target information stored in the storage and determine a particular relay target transmission source bus designated for the identifier within the relay target information in response to determining that the identifier of the data frame is designated for relay; and
the one or more controllers are configured to determine whether the reception bus matches the particular relay target transmission source bus designated for the identifier within the relay target information in response to determining that the identifier of the data frame is designated for relay.

6. The gateway apparatus according to claim 5, wherein:
in response to determining that the reception bus does not match the particular relay target transmission source bus, the data frame is determined to be abnormal.

7. The gateway apparatus according to claim 5, wherein:
the one or more controllers are configured to determine whether the data frame received by the receiver includes the identifier that is designated for monitoring in response to determining that the reception bus matches the particular relay target transmission source bus, or in response to determining that the identifier of the data frame is not designated for relay.

8. The gateway apparatus according to claim 4, wherein:
the one or more controllers are configured to perform no abnormality detection on the data frame in response to determining that the identifier of the data frame is not designated for monitoring.

9. The gateway apparatus recited by claim 4, wherein the one or more controllers are configured to perform the abnormality detection on the data frame to authenticate the data frame, the abnormality detecting including receiving a message authentication code for the data frame, obtaining a hash value by applying a shared key to data of the data frame, comparing the obtained hash value with the received message authentication code, and authenticating the data frame in response to the obtained hash value matching the received message authentication code.

10. A gateway apparatus connected to a plurality of buses to monitor and relay data frames, comprising:
  a receiver configured to receive a data frame using a reception bus that is one of the plurality of buses;
  a storage configured to store relay target information that includes a plurality of frame identifiers designated for relay and a relay target transmission source bus designated for each frame identifier of the plurality of frame identifiers designated for relay; and
  one or more controllers communicably connected with the receiver and the storage, the one or more controllers being configured
    to determine whether an identifier of the data frame received by the receiver is designated for relay based on the relay target information stored in the storage,
    to determine a particular relay target transmission source bus designated for the identifier within the relay target information in response to determining that the identifier of the data frame is designated for relay, and
    to determine whether the reception bus matches the particular relay target transmission source bus designated for the identifier within the relay target information in response to determining that the identifier of the data frame is designated for relay,
  wherein:
  the storage is further configured to store monitoring target information that includes a plurality of frame identifiers designated for monitoring and a monitoring target transmission source bus designated for each frame identifier of the plurality of frame identifiers; and
  the one or more controllers are further configured
    to determine whether the data frame received by the receiver includes an identifier that is designated for monitoring based on the monitoring target information stored in the storage in response to determining that the reception bus matches the particular relay target transmission source bus, or in response to determining that the identifier of the data frame is not designated for relay,
  in response to determining that the identifier of the data frame is designated for monitoring:
    (i) to determine a particular monitoring target transmission source bus designated for the identifier,
    (ii) to determine whether the reception bus matches the particular monitoring target transmission source bus designated for the identifier within the monitoring target information, and
    (iii) to perform abnormality detection on the data frame to authenticate the data frame in response to determining that the reception bus matches the particular monitoring target transmission source bus; and
  in response to determining that the identifier of the data frame is not designated for monitoring: (iv) to relay the data frame to a transmission destination when the data frame is designated for relay, and (v) to discard the data frame when the data frame is not designated for relay.

11. The gateway apparatus according to claim 10, wherein:

in response to determining that the reception bus does not match the particular monitoring target transmission source bus, the data frame is determined to be abnormal.

12. The gateway apparatus according to claim 10, wherein:
in response to determining that the reception bus does not match the particular relay target transmission source bus, the data frame is determined to be abnormal.

13. The gateway apparatus according to claim 10, wherein the one or more controllers are configured to perform the abnormality detection on the data frame to authenticate the data frame, the abnormality detection including receiving a message authentication code for the data frame, obtaining a hash value by applying a shared key to data of the data frame, comparing the obtained hash value with the received message authentication code, and authenticating the data frame in response to the obtained hash value matching the received message authentication code.

14. The gateway apparatus according to claim 10, wherein:
the one or more controllers are configured to perform no abnormality detection on the data frame in response to determining that the identifier of the data frame is not designated for monitoring.

15. A computer-implemented abnormality monitoring method performed by a computer in a gateway apparatus connected to a plurality of buses,
the method comprising:
receiving a data frame by using a reception bus that is one of the plurality of buses;
determining whether an identifier of the data frame received by the receiver is designated for relay based on relay target information that includes a plurality of frame identifiers designated for relay and a relay target transmission source bus designated for each frame identifier of the plurality of frame identifiers designated for relay;
determining a particular relay target transmission source bus designated for the identifier within the relay target information in response to determining that the identifier of the data frame is designated for relay; and
determining whether the reception bus matches the particular relay target transmission source bus designated for the identifier within the relay target information in response to determining that the identifier of the data frame is designated for relay;

determining whether the received data frame includes an identifier that is designated for monitoring based on monitoring target information in response to determining that the reception bus matches the particular relay target transmission source bus, or in response to determining that the identifier of the data frame is not designated for relay,
the monitoring target information including a plurality of frame identifiers designated for monitoring and a monitoring target transmission source bus designated for each frame identifier of the plurality of frame identifiers;
in response to determining that the identifier of the data frame is designated for monitoring:
(i) determining a particular monitoring target transmission source bus designated for the identifier within the monitoring target information;
(ii) determining whether the reception bus matches the particular monitoring target transmission source bus designated for the identifier within the monitoring target information; and
(iii) performing abnormality detection on the data frame to authenticate the data frame in response to determining that the reception bus matches the particular monitoring target transmission source bus;
in response to determining that the identifier of the data frame is not designated for monitoring: (iv) relaying the data frame to a transmission destination when the data frame is designated for relay, and (v) discarding the data frame when the data frame is not designated for relay.

16. The computer-implemented abnormality monitoring method recited by claim 15, wherein performing the abnormality detection on the data frame to authenticate the data frame includes receiving a message authentication code for the data frame, obtaining a hash value by applying a shared key to data of the data frame, comparing the obtained hash value with the received message authentication code, and authenticating the data frame in response to the obtained hash value matching the received message authentication code.

17. A non-transitory computer readable storage medium storing a computer program executable by a computer to perform the computer-implemented abnormality monitoring method according to claim 15.

* * * * *